UNITED STATES PATENT OFFICE.

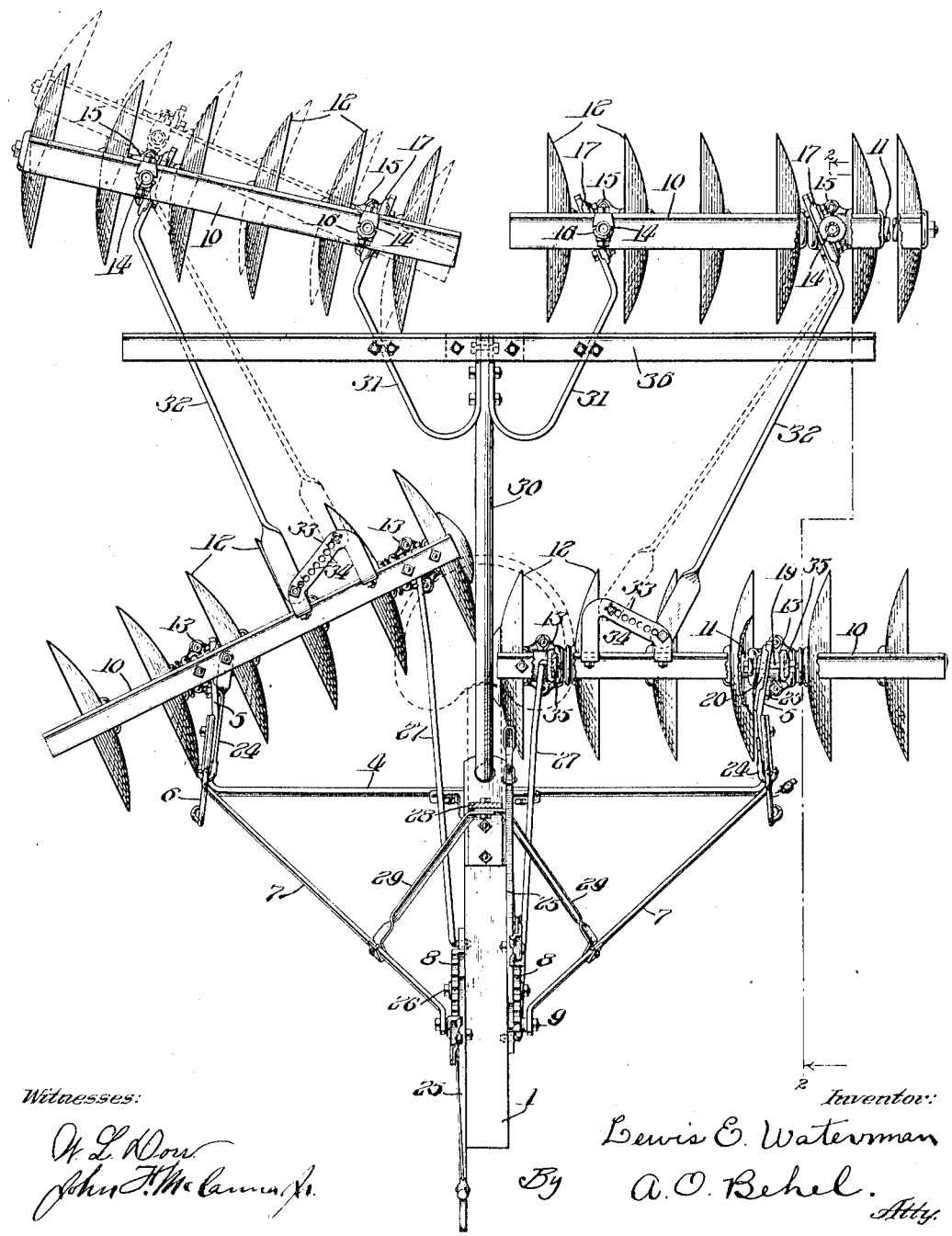

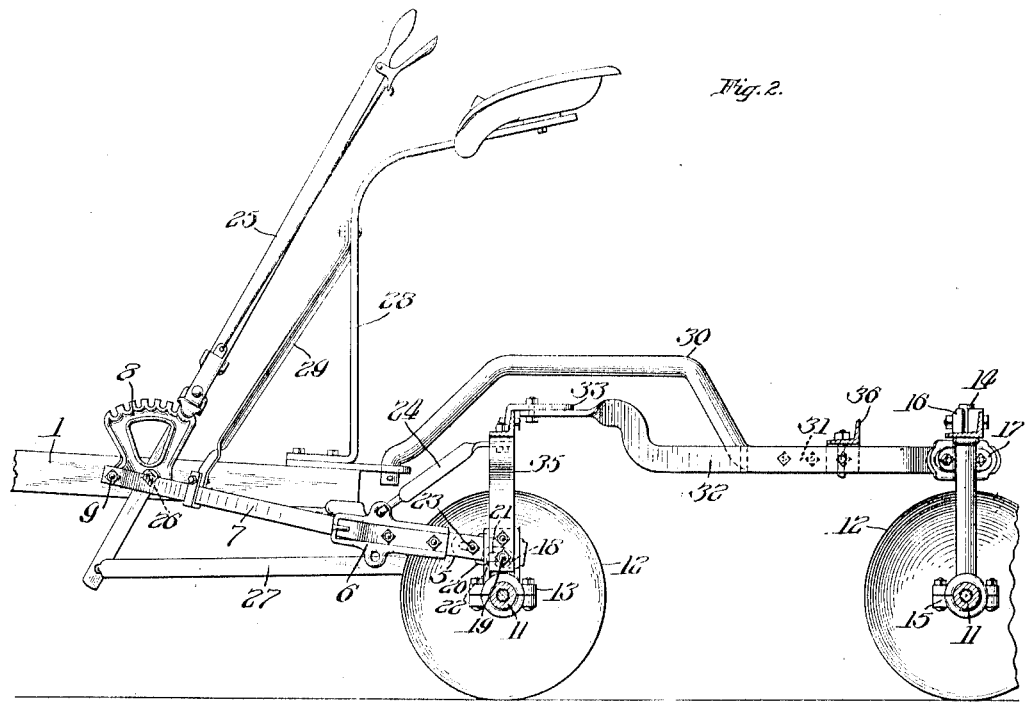

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

HARROW.

1,081,918.  Specification of Letters Patent.  Patented Dec. 16, 1913.

Application filed April 10, 1913. Serial No. 760,222.

*To all whom it may concern:*

Be it known that I, LEWIS E. WATERMAN, a citizen of the United States, residing at Rockford, in the county of Winnebago and State of Illinois, have invented certain new and useful Improvements in Harrows, of which the following is a specification.

This invention relates to harrows and more particularly to that type of harrow having front and rear gangs in which each set of gangs is pivoted at diagonally opposite ends such as is described in my patent for harrows No. 984,625, dated Feb. 21, 1911.

The object of this invention is to provide a novel adjustable connecting bar between a front and rear gang, which when the gangs are parallelly arranged and at right angles to the line of draft, may be moved to its various adjustments without affecting the parallel position of the gangs, but when the gangs have been angled to the line of draft, such adjustment will give the gangs a greater angled position relative to an angled position attained without the adjustment made.

The further object is to construct an improved carrying frame for the gangs.

In the accompanying drawings, Figure 1 is a plan view of my improved harrow showing one set of the gangs angled to the line of draft, and in both sets, the connecting bar shown dotted in an adjustable position. Fig. 2 is a side elevational view as taken on the line 2—2 of Fig. 1.

The forward draft frame is carried by the tongue 1, and comprises a cross-bar 4 bolted to the end of the tongue and having rearwardly extending ends 5, draft attachment brackets 6 bolted to the outer side of said ends 5, and diagonal rods 7 having their rear ends extending through and bolted to the outside of the brackets 6, their forward ends being secured to the tongue to the outer side of the segment brackets 8 located adjacent each side of the tongue, by bolt 9, which also passes through the segment brackets.

The main construction of the rear and front gangs is similar, each having an angle support 10 to which downwardly extending connections are secured carrying axles 11 and upon which are mounted a plurality of earth agitating disks 12. The connections of the forward gangs between the supports 10 and axles are vertical bars 35, their lower ends being bolted to journal-brackets 13 and their upper ends bolted to the supports 10. These connections for the rear gangs are vertical rods 14 having their lower ends connected to the journal-brackets 15, and their upper ends bolted by brackets 16 to supports 10, the pivotal sleeve-brackets 17 being mounted on rods 14 between the supports 10 and axles.

The front gangs have a pivotal and detachable connection near their outer ends to the forward draft frame by the ends 5 of the bar 4, said ends having an opening 18 in their lower face in which a horizontal rigid bolt 19 carried by brackets 13 engages, the ends 5 being provided with detachable brackets 20 having an elongated slot 21 with an opening 22 at the forward end thereof, and an adjusting bolt 23. With bolt 19 located in slot 21 and the bracket 20 moved to one end thereof and bolted in an operative position as shown, to detach bar 5, bolt 23 is loosened and the bracket 20 moved rearward and raised, bolt 19 passing through opening 22. Brace rods 24 have a pivoted bolt connection with supports 10 and a hook connection with brackets 6. Hand levers 25 pivoted to segments 8 by bolt 26, have common thumb-catch engagements with the segments, and a link 27 pivotally connecting their lower ends with the inner bars 35 of the forward gangs.

A seat support 28 bolted to the tongue, carries a seat at its upper end, and is braced by bars 29.

An arched rod 30 has its forward end pivotally connected to the end of the tongue and has bolted to its rear end two diverging links 31 which have their rear ends bolted to the pivotal brackets 17 and form axle supports for the rear gangs.

Connecting-bars 32 have their rear ends bolted to the pivotal brackets 17 at the outer free ends of the rear gangs, and have their forward ends adjustably connected to the front gangs to the inner sides of the pivot axes thereof. These adjustable connections are by means of brackets 33 bolted to supports 10 and have a plurality of spaced holes 34 arranged in lines struck from a radius with the pivot axes of the rear gangs as a center, the forward ends of connecting-rods 32 being shown bolted in the holes nearest the front supports 10. Since the rear gangs have a substantially rigid connection at their inner ends only to hold them in position and from vertical movement, the outer ends of these gangs through play in the brackets 15, have a vertical movement which allows them to drop at certain times to conform to low spots in the ground level. A cross angle-bar 36 is bolted to the rear end of rod 30 and to the side links 31, having its extending ends over-reaching the connecting-bars 32 and serving as stop for these bars to limit their upward movement, in other words, to hold the free ends of the gangs down in a working position when in operation.

To move one set of gangs to an angled position, lever 26 is swung forward swinging the front gang by link 27, on its pivot axis, and which by its connecting-bar 32 swings the rear gang to an angle opposite to that of the front gang, as the gangs are pivoted at diagonally opposite ends. When a greater difference in angle degree between the two gangs in their angled position is desired, connecting-bar 32 is adjusted in holes 34 to suit, having shown such an adjusted position in dotted lines on the angled set of gangs in Fig. 1. It will be noticed that when the front gang is moved back to its normal position, that the rear gang is parallel therewith regardless of the adjustment made for the difference in degree of the gangs in their angled position. This feature is accomplished by the adjusting of the free end of the connecting-bar as it is swung on its pivot, with the gangs parallel, thus the farther it is swung from its position near the support 10, the greater will be the difference in the angle of the gangs when in their angled postions.

With a frame work as here disclosed the independent working of the gangs is devoid of fixed rigidity, since the forward gangs in their connections at their pivots have a certain amount of lateral movement, while the rear gangs as a whole have lateral movement from the pivotal support of rod 30, thus making an easy drawing harrow because of the capability of the independent gangs to conform to irregularities of the ground.

I claim as my invention—

1. The combination with a frame, of front and rear earth agitating devices pivotally connected thereto, a bar pivotally connected to one of the devices at one side of its pivot, and to the other device on the other side of its pivot, said bar having one of its pivot connections adjustable in a horizontal plane to and away from its device, and means for swinging said devices.

2. The combination of a frame, of a front and rear gang of earth agitating devices pivotally connected thereto, a bar pivotally connected to one of the gangs on one side of its pivot, and having an adjustable connection with the other gang on the other side of its pivot to allow the free end of the bar to be adjusted in varying positions swung from the bar-pivot, and means for swinging the gangs.

3. The combination with a frame, of a front and rear gang of earth agitating devices pivotally connected thereto, adjustable means connecting the gangs at opposite sides of the pivots of the gangs and capable of adjustment with the gangs parallel without effecting said parallel relation, and so that when the gangs are angled relative to each other a greater divergence of the gangs is obtained, and means for swinging the gangs.

4. The combination with a frame, of a front and rear gang of earth agitating devices pivotally connected thereto, means connecting the gangs and capable of adjustment while maintaining the gangs in a parallel position, to vary the divergence of the gangs when they are angled relative to each other and means for swinging the gangs.

5. The combination with a frame, of a front and rear gang of earth agitating devices pivotally connected thereto, a bar pivoted to one of the gangs on one side of its pivot, a series of connection points carried by the other gang on the other side of its pivot and arranged in a line concentric with the pivot of said bar, the free end of the bar adapted to be fastened at any one of said connection points, and means for swinging the gangs.

6. The combination with a frame, of a front and rear gang of earth agitating devices pivotally connected thereto, a bar pivoted to one of the gangs, a series of holes in the other gang, horizontally spaced and arranged concentric with the pivot of said bar, the free end of said bar adapted to be pivotally connected in any one of said holes, and means for swinging the gangs.

7. The combination with a frame, of a front and rear gang of earth agitating devices pivotally connected thereto, a bar pivotally connected to one of the gangs and having an adjustable connection with the other gang capable of adjustment in a horizontal plane to and away from its gang, and means for swinging the gangs.

8. The combination with a frame, of a front and rear gang of earth agitating devices pivotally connected thereto, a bar pivotally connected to one of the gangs on one side of its pivot, a series of connection points carried by the other gang on the other side of its pivot and arranged in a line diagonal to the longitudinal axis of its gang, the free end of said bar adapted to connect to any one of said connection points, and means for swinging the gangs.

9. The combination with a frame, of a front and rear gang of earth agitating devices pivotally connected thereto, means pivotally connecting the gangs on one side of the pivot of one of the gangs and on the other side of the pivot of the other gang, and capable of adjustment with respect to the pivots of the gangs in a horizontal plane without disturbing the position of the gangs relative to each other, and means for swinging the gangs.

10. The combination with a frame, of a front and rear gang of earth agitating devices pivotally connected thereto, a bar pivotally connected to one of the gangs on one side of its pivot and having an adjustable connection with the other gang capable of horizontal adjustment to and away from its gang, a lever pivoted to the frame forward of the front gang, and a link connecting said lever and the front gang for swinging the gangs.

11. The combination with a frame, of front and rear gangs, of earth agitating devices pivotally connected thereto, the front gangs capable of independent lateral movement on their pivot connections, and the rear gangs capable of bodily transverse movement, pivotal connections between the gangs, and means for swinging the gangs.

12. The combination with a frame, of forward gangs pivotally connected to the frame, a rearwardly extending frame member pivoted to the frame at a central point thereon, rearwardly and outwardly diverging members connected to the rear end of said pivoted frame member, rear gangs pivotally connected to said diverging members, a pivotal connection between each of the forward and rear gangs, and means for swinging the gangs.

13. The combination with a frame, of forward gangs pivotally connected at their outer ends to the frame, a rearwardly extending frame member pivoted to the frame at a center point thereon and carrying at its rear end rearwardly diverging side members, rear gangs pivoted at their inner ends to said side members, bars pivotally connecting the gangs at the ends opposite the pivots of the gangs, and means for swinging the gangs.

14. The combination of a tongue, a forward draft frame attached thereto having laterally extending side members, draft connections attached to the ends of said side members, forward gangs pivotally connected at their outer ends to the ends of said side members, a rear frame member pivoted to the rear end of said tongue and carrying at its rear end outstanding side members, rear gangs pivoted at their inner ends to said rear side members, bars pivotally connecting the gangs at the ends opposite the pivots of the gangs, and means for swinging the gangs.

15. The combination of a tongue, a forward draft frame attached thereto having laterally extending side members, draft connections attached to the ends of said side members, forward gangs pivotally connected to the ends of said side members, a rear frame member pivoted to the rear end of said tongue and carrying at its rear end outstanding side members, rear gangs pivoted to said rear side members, bars pivotally connecting the gangs, and means for swinging the gangs.

16. The combination with a frame, of a front and rear gang of earth agitating devices pivotally connected thereto, a connection between the gangs connecting the gangs on opposite sides of their pivots, means adjacent the side of one of the gangs opposite its pivot adapted to limit the upward movement of said side and allow vertical movement below said limit, and means for swinging the gangs.

17. The combination with a frame, of a front and rear gang of earth agitating devices pivotally connected thereto, a bar connecting the gangs, means adapted to contact said bar and limit the upward movement thereof, and allow vertical movement below said limit, and means for swinging the gangs.

In testimony whereof I have hereunto set my hand in presence of two subscribing witnesses.

LEWIS E. WATERMAN.

Witnesses:
JOHN F. MCCANNA, Jr.,
E. D. E. N. BEHEL.